Nov. 23, 1937.   G. E. WHITEHEAD   2,100,230
ELECTRICAL SWITCH GEAR
Filed Sept. 18, 1936   2 Sheets-Sheet 1

INVENTOR
GEORGE E. WHITEHEAD
By Norris & Bateman
ATTORNEYS

Nov. 23, 1937.   G. E. WHITEHEAD   2,100,230
ELECTRICAL SWITCH GEAR
Filed Sept. 18, 1936   2 Sheets-Sheet 2

INVENTOR
GEORGE E. WHITEHEAD
By Norris & Bateman
ATTORNEYS

Patented Nov. 23, 1937

2,100,230

UNITED STATES PATENT OFFICE 2,100,230

ELECTRICAL SWITCH GEAR

George Ethelbert Whitehead, Cardiff,
South Wales

Application September 18, 1936, Serial No. 101,507
In Great Britain October 23, 1935

3 Claims. (Cl. 175—298)

This invention relates to electrical switchgear more especially for moderate voltages of the order of 100–1000 volts and currents of the order of 50 to 500 amperes. For such voltages the switch or circuit breaker members and also fuse carriers, if any, have usually been of the knife blade air break type with the contacts located side by side in metal box or casing units of rectangular section. In most arrangements the switchgear has been in units each comprising busbars located one above the other horizontally in a metal box or casing of rectangular section beneath which is secured a box containing the knife switches and beneath which may be secured a box containing the removable fuses whilst at the base is secured a cable entry box. In many cases circuit breaker isolating switches are also provided usually located in additional box or casing units and generally replacing the fuses.

Objects of the present invention are to provide simplified and cheaper structures, to improve the electrical layout therein and to reduce the volumetric space occupied by switchgear of the kind referred to.

A switchgear unit in accordance with the present invention comprises a longitudinal framework, preferably rectangular in cross section, divided by cross members into three main compartments, an end one of which, preferably that at the base, contains busbars and circuit breaker terminals connected therewith, the remote compartment containing a group of circuit breaker terminals which may be connected such as with cable ends coming from a cable entry box, whilst the middle compartment contains a plurality of pairs of aligned fixed circuit breaker contacts and moving bridge contacts carried by a spider or rotor which is rotatable on a longitudinal axis for closing and opening the circuit breaker. Preferably the fixed contacts are of the jaw type with the jaws tangentially arranged whilst the moving bridges are longitudinal bars which may be of flattened cylindrical form. Preferably the fixed and moving contacts are arranged so that when the circuit breaker is closed each moving contact is substantially in line with the terminal stems of a pair of fixed contacts which latter are laterally supported from their stems.

The invention also comprises for or as part of a switchgear unit of the kind referred to, or for or as part of the switchgear unit above set forth, a circuit breaker comprising a plurality of longitudinally spaced pairs of aligned "fixed" contacts and an equal number of co-operating bridges carried by a spider or rotor disposed between the bars of "fixed" contacts and mounted on a longitudinal shaft whereby the circuit breaker can be opened and closed, the "fixed" contacts at at least one end being fixed to longitudinal stems carried on a co-axial spider or rotor so that said stems can be brought into engagement and disengagement with further fixed contacts whereby the circuit breaker can be isolated such as from busbars.

The invention also comprises for or as part of a switchgear unit of the kind referred to, or for or as part of the switchgear unit above set forth, a circuit breaker comprising a group of tangentially disposed jaw contacts fixed in circular distribution, a coaxial similar group of jaw contacts, and between said two groups of jaw contacts a coaxial spider or rotor carrying a group of longitudinal rods or bars adapted upon partial rotations of said spider or rotor to bridge or disengage the respective pairs of contacts of the two fixed groups.

Circular insulating barriers may be disposed between groups of co-operating contacts in the interests of safety, which barriers may be secured to the rotors so as to rotate therewith. Radial interphase barriers may be mounted on the rotors or spiders.

The second or isolating spider or rotor may be mounted on a sleeve rotatable on the shaft of the circuit breaker spider and may be rotated for example by a link connected with a hinged door or cover which may be interlocked so that it cannot be opened until the circuit breaker is opened.

A throw-off spring for the circuit breaker may be coiled around its operating shaft or arranged in any other manner. Said shaft may extend to operating and tripping mechanism in an end compartment of the switchgear wherein may be disposed the usual transformers and adjacent to which the cable entry box may be fixed.

The aforesaid framework preferably comprises a pair of parallel rectangular end plates united by four longitudinal angle iron members disposed at the corners. The front, back and sides may be closed by sheet steel. In the case however of a plurality of switchgear units arranged side-by-side in the usual manner it is necessary to close the framework by sheet steel (or the like) at back and front only, whilst the upper two compartments between an adjacent pair of switchgear units can be separated by a sheet of asbestos board.

In a constructional example of three-phase isolating switchgear unit in accordance with the invention rated for 120 amperes at 600 volts the total height is about 3 feet 3 inches and the section about 7½ inches square.

The switch closing handle or hand wheel can conveniently be located along with any instruments required, at the front of the top compartment of the unit. The isolating switch may be operable independently of an inspection door.

A novel jaw contact which is preferably used in the circuit breaker and/or isolating switch above set forth, is hereinafter described.

To enable the invention to be clearly understood and carried into effect it will now be described by way of example with reference to the accompanying drawings, in which Fig. 1 is a side elevation of a switchgear unit in accordance with the invention, with the side panel removed.

Figure 1:
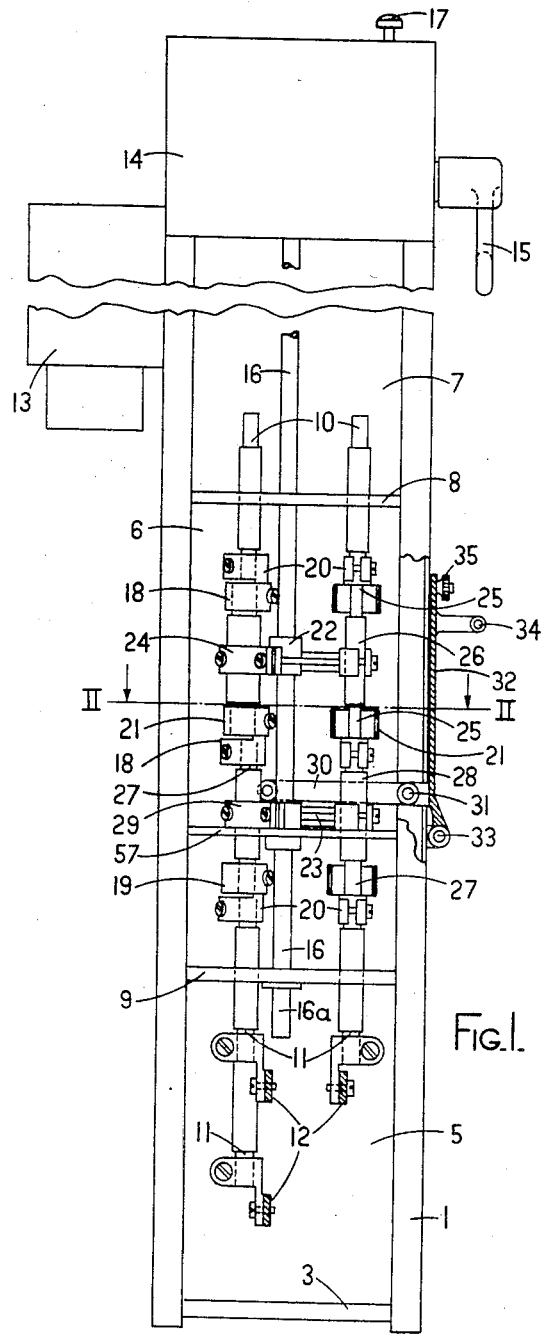
Figure 4:
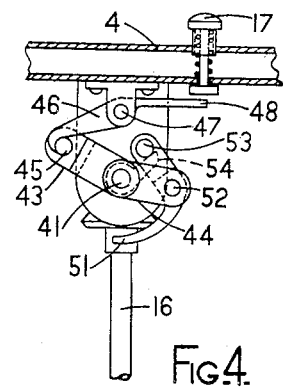
Figs. 3 and 4 are side and front views respectively of latch and tripping mechanism which may conveniently be employed in the switchgear illustrated at Figs. 1 and 2.
Figure 3:
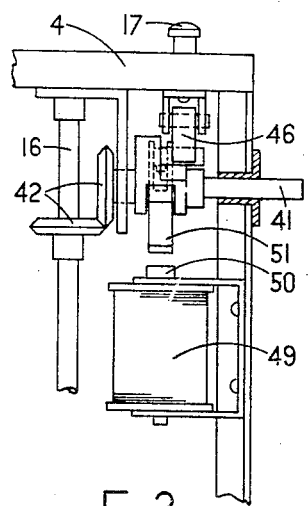

Referring first to Fig. 1 of the drawings, the main longitudinal framework, which in the particular example is vertical, comprises four members 1 (only two of which are visible in the figure) of an angle section secured to the corners of two parallel rectangular end members 3 (Fig. 1) and 4 (Figs. 3 and 4), which may be die castings. Said framework is normally closed by sheet iron or asbestos board as hereinbefore set forth. Said framework is divided into three main compartments indicated respectively at 5, 6 and 7, by two transverse partitions 8 and 9, the former of which rigidly carries a group of shrouded terminal rods 10 and the latter of which partitions carries shrouded terminal rods 11, which are attached to the busbars 12. The terminal rods 10 may be connected in a manner which will be well understood by those skilled in the art to the ends of a cable which may be brought into the cable-entry box 13 secured to the rear of the upper compartment 7. This compartment according to circumstances may contain the usual transformers or even fuses. Above the compartment 7 is a fourth compartment 14 which contains operating mechanism for the circuit breaker and tripping gear therefor, an example of which is hereinafter described with reference to Figs. 3 and 4.

In Fig. 1 is shown the circuit breaker operating handle 15 at the front of the switchgear unit which handle rotates through an angle of approximately 60 degrees the circuit breaker operating shaft 16 which is mounted on a bearing at the top of the switchgear unit and passes through other bearings in the partitions 8 and 9. At 17 is shown a press-button whereby the circuit breaker may be tripped by hand.

Figure 2:
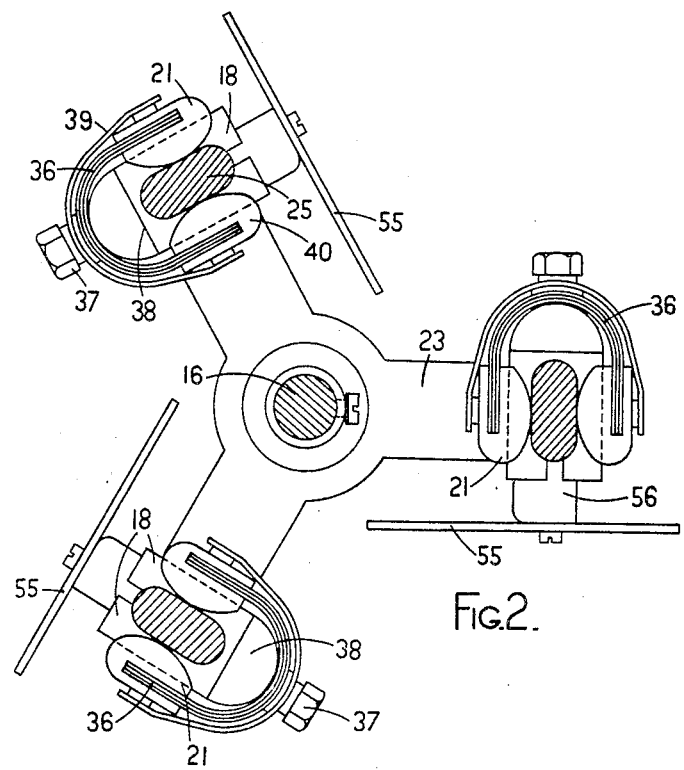
Fig. 2 is a sectional plan view on the lines II—II of Fig. 1, showing the isolating rotor with its jaw contacts and the bridging contacts of the circuit breaker.

Referring now to Fig. 2 as well as Fig. 1, the two groups 10 and 11 of contact terminal stems carry at their lower and upper ends respectively jaw contacts 18 and 19 which are fixed to said stems by means of clamps 20. At 21 are shown further jaw contacts which are mounted as will be hereinafter described. The jaw contacts 18, 19 and 20 are tangentially arranged and circularly distributed about the shaft 16, namely in the case of the three-phase switchgear illustrated at angles of 120 degrees with respect to one another, as will be clearly seen from Fig. 2.

Rigidly carried on the shaft 16 is a spider or rotor 22 and loosely mounted on said shaft 16 is another spider or rotor 23 which latter is shown in Fig. 2. The spider or rotor 22 has clamped to it by means of the straps 24 three vertical bars which, at least at their ends, are of flattened cylindrical section, as indicated at 25 in Fig. 2, which bars moreover are shrouded in insulating material at their centre portions as indicated at 26. The bare ends of the bars which are preferably of copper, are adapted to engage or disengage, according to the rotational movement of the spider or rotor 23, the fixed jaw contacts 18 and 21, which together with the bridging rods or bars 25 constitute the circuit breaker, which in the arrangement illustrated is of the air break type, although it will be understood that said contacts may be immersed in oil if provision is made for retaining oil in the centre compartment 6.

It will be understood that each of the lower circuit breaker "fixed" contacts 21 is vertically beneath a "fixed" contact 18 under normal operating conditions. The jaw contacts 21 are secured by clamps 19 to the upper ends of rods or bars 27 which are shrouded at 28 and clamped by straps 29 (Fig. 1) to the lower spider 23 which is the isolating spider. The lower ends of the rods or bars 27 co-operate with the further "fixed" jaw contacts 19 and it will now be appreciated that when the circuit breaker spider or rotor 22 has been rotated to open the circuit, the isolating spider or rotor 23 may be rotated in the same direction but through a smaller angle to effect isolation of the busbars 12 from the circuit breaker. Such movement of the isolating spider or rotor 23 may be effected by means of a suitably interlocked operating member (not shown), such as a handle, but in the arrangement illustrated a vertical arm (not visible) on said spider 25 is connected by means of a link 30 with a pin 31 rigid with an inspection door 32 hinged at 33 to the front panel of the switchgear unit, which door is provided with a handle 34 and is adapted to be held closed by means of a screw 35 which may be arranged so that it cannot be operated unless the circuit breaker has previously been opened. It will be appreciated that the door 32 gives access to, or permits inspection of, the circuit breaker contacts when in the open position.

Referring now more particularly to Fig. 2, the form of jaw contact which it is preferred to use in the circuit breaker and switch gear of the present invention, comprises a resilient U-shaped member 36 which is preferably of laminated copper or brass and which is secured by means such as a set screw 37 to the D-shaped stub members 38 which extend longitudinally but excentrically from the clamp members 18 and 20. If necessary the main jaws 36 may be reinforced by stiff steel backing springs of similar shape, such as illustrated at 39. In the preferred construction illustrated in Fig. 2 the actual contact faces of the jaws are not parallel plane surfaces but are curved convex towards each other whereby the tendency to any burning at the instant of opening and closing of the co-operating contacts is reduced or its effects minimized. Said curved faces are conveniently provided by pressing on, or otherwise fixing to, the ends of the resilient members 36 shorter members 40 which are also substantially of U-shape.

The operating spring of the circuit breaker shaft 16 is not shown but it may be located at any convenient position. For instance, it may be a helical spring surrounding the lower extremity 16a of said shaft and anchored thereto and to the partition 9. The operating handle 15 is attached to a shaft 41 (Figs. 3 and 4) which drives the shaft 16 through the bevel wheels 42, or other driving mechanism may be employed. The tripping catch mechanism illustrated by way of example is constituted as follows.

Rigid on the shaft 41 is a lever having two arms 43 and 44, of which the arm 43 is provided with a pin 45 which is adapted to be held by a gravity lever 46 pivoted to the framework at 47 and having a light arm 48 disposed beneath the spring-returned press-button 17. The arrangement is such as will be readily followed from an inspection of Fig. 4 that upon depression of the button 17 the hook of the lever 46 releases the lever 43 and allows the circuit breaker to be opened by its throwoff spring. When the shaft 41 is rotated by the handle 15 to close the circuit breaker contacts the pin 45 travels into engagement with a hook of the lever 46 and is automatically held thereby.

A solenoid tripping arrangement is shown in addition to the press-button trip. The solenoid is shown at 49 and its gravity core at 50, which latter upon energization of the solenoid hits the tail of a gravity lever 51 which is pivoted at 52 to the end of the arm 44 of the lever previously described. The lever 51 extends beyond its pivot 52 and at its end is provided with a pin or roller 53 which is adapted to be engaged by a further arm 54 of the aforesaid lever 43—44. The weight of the lower part of the lever 51 brings the said lever into the correct position for the pin 53 thereof to be engaged and to retain the arm 54 when the shaft 41 is rotated to close the circuit breaker contacts. It will be clear from an inspection of Fig. 4 that raising the lower arm of the lever 51 will cause the arm 54 of the main lever to be released, thus allowing the throwoff spring to open the circuit breaker.

At 55 (Fig. 2) are shown the interphase insulating barriers secured to projecting parts 56 of the isolating spider or rotor 23 for the purpose of illustration, but they are preferably secured to the circuit breaker spider or rotor. At 57 (Fig. 1) is shown an insulating disc secured to the isolating spider or rotor.

Instruments or an instrument panel may be mounted on the top of the switchgear unit.

It will be understood that various minor modifications, other than those already indicated, may be made in the arrangement shown, within the scope of the invention.

I claim:

1. An electrical switchgear unit for moderate voltages comprising a vertical framework, horizontal cross-partitions dividing said framework into three superimposed compartments, transverse busbars contained in one of the end compartments and having rod-like circuit breaker terminal stems directly connected therewith, rod-like circuit breaker terminal stems contained in the remote compartment and adapted to be connected with cable ends, and a circuit breaker contained in the middle compartment and having pairs of fixed contacts, the members of each pair of fixed contacts being in vertical alignment, and moving bridge contacts comprising longitudinal rods and a spider carrying said longitudinal rods, said spider being rotatable on a vertical axis, each moving contact rod being in line with the terminal stems of a pair of fixed contacts when the circuit breaker is closed and giving a straight through electric circuit disposition.

2. A switchgear unit according to claim 1, wherein said fixed contacts of the circuit breaker at at least one end are mounted on an additional spider coaxial with the other spider and said fixed contacts are movable into engagement and disengagement with further fixed contacts connected with the busbars.

3. A switchgear unit according to claim 1, wherein the circuit breaker spider is secured to a vertical operating shaft extending into the top compartment, and tripping and operating mechanism for the circuit breaker is disposed in said top compartment and connected to said operating shaft.

GEORGE ETHELBERT WHITEHEAD.